(12) United States Patent
Fei et al.

(10) Patent No.: US 6,781,112 B1
(45) Date of Patent: Aug. 24, 2004

(54) DEVICE FOR SECURING AT LEAST ONE OPTICAL FIBRE TO AN OPTICAL APPARATUS

(75) Inventors: Enzo Fei, Bologna (IT); Daniele Lippi, Bologna (IT)

(73) Assignee: DataSensor S.p.A. (IT)

( * ) Notice: Subject to any disclaimer, the term of this patent is extended or adjusted under 35 U.S.C. 154(b) by 0 days.

(21) Appl. No.: 09/401,730

(22) Filed: Sep. 23, 1999

(30) Foreign Application Priority Data

Sep. 23, 1998  (EP) .............................................. 98830558

(51) Int. Cl.⁷ ................................................. G01J 1/04
(52) U.S. Cl. ..................... 250/227.11; 385/65
(58) Field of Search ....................... 250/227.11, 227.28, 250/227.29, 227.3, 239; 385/52–56, 57–65, 69, 70, 77, 78, 83, 86–92, 94

(56) References Cited

U.S. PATENT DOCUMENTS

| | | | |
|---|---|---|---|
| 4,227,078 A | 10/1980 | Yamamoto et al. .... | 250/227.11 |
| 4,233,506 A | 11/1980 | Yamamoto et al. ...... | 250/227.4 |
| 4,605,280 A * | 8/1986 | Welber et al. ................. | 385/88 |
| 4,720,630 A * | 1/1988 | Takeuchi et al. ............ | 250/239 |
| 4,812,003 A * | 3/1989 | Dambach et al. ............. | 385/79 |
| 4,986,625 A * | 1/1991 | Yamada et al. ............... | 385/55 |
| 5,032,718 A * | 7/1991 | Murakami ................ | 250/227.2 |
| 5,274,723 A * | 12/1993 | Komatsu ...................... | 385/92 |
| 5,555,333 A * | 9/1996 | Kato ............................ | 385/89 |

FOREIGN PATENT DOCUMENTS

| | | |
|---|---|---|
| DE | 30 04 379 | 8/1980 |
| EP | 0 313 956 A2 | 5/1989 |
| EP | 0 328 011 | 8/1989 |
| WO | 87/03969 | 7/1987 |

* cited by examiner

Primary Examiner—Thanh X. Luu
(74) Attorney, Agent, or Firm—IPLM Group, P.A.

(57) ABSTRACT

A device (1) for securing at least one optical fibre (2; 3; 4; 5) to an optical apparatus (6) is proposed, comprising at least one photo-element (20; 21; 22; 23) mounted on a supporting element (24) and at least one optical fibre (2; 3; 4; 5) which can be connected to the photo-element (20; 21; 22; 23); the securing device (1) comprises at least one transparent part, such that a region of the coupling between the fibre and the photo-element is visible.

A securing device (1) is also proposed, comprising a slide (7) provided with at least one slot (8), which assumes a first and a second position; in the first position, the slot (8) is coaxial with a hole (25) in the supporting element (24) and freely houses the optical fibre (2; 3; 4; 5), while in the second position the slot (8) is out of alignment with the hole (25) and exerts on the optical fibre (2; 3; 4; 5) a force which keeps it secured in the hole (25). (FIG. 1).

26 Claims, 3 Drawing Sheets

DEVICE FOR SECURING AT LEAST ONE OPTICAL FIBRE TO AN OPTICAL APPARATUS

BACKGROUND OF THE INVENTION

1. Field of the Invention

The present invention relates to a device for securing at least one optical fibre to a optical apparatus.

2. Discussion of the Prior Art

There are known optical apparatus such as, for example, optical sensors operating with a single emission wavelength (colour), comprising a photo-emitter and a photo-detector (photo-elements). The photo-emitter generates a beam of light which is channelled into an optical fibre so that it is transported into a region to be monitored. The light reflected from the monitored region is channelled into another optical fibre and transported to the photo-detector.

In known optical sensors, each of the two optical fibres, that used for emission and that used for detection, is held in position, with respect to the photo-emitter and the photo-detector, by its own securing means of the screw, lever or button type.

Consequently, each securing means requires its own stage of manufacture, and each fibre requires its own alignment and fixing operation.

However, these known sensors do not enable the operator to check in a direct way the correct alignment of a fibre with a photo-element.

SUMMARY OF THE INVENTION

A first aspect of the present invention therefore consists of a device for securing at least one optical fibre to an optical apparatus, the said optical apparatus comprising at least one photo-element mounted on a supporting element and at least one optical fibre which can be connected to the said photo-element by means of the said securing device, characterized in that at least a part of the said securing device is made from a transparent material which makes a region of the coupling between the fibre and the photo-element visible.

According to a preferred embodiment, the said device comprises a cover made from transparent material. The said supporting element is also made from transparent material.

Preferably, the said transparent material is selected from the group comprising glass, polycarbonate (PC), polymethyl methacrylate (PMMA), polystyrene (PS), acrylonitrile-styrene (SAN), acrylonitrile-butadiene-styrene (ABS), polyphenylene oxide (PPO), polyurethane (PUR), polysulphone (PSU), polyamide (PA), polyvinyl chloride (PVC), and polyphenylene sulphide (PPS).

The known securing means are also particularly inadequate for multiple-fibre optical sensors comprising two or three photo-emitters, each capable of emitting a light beam of a predetermined colour and optically connected to a corresponding emission fibre. Typically, for example, three-fibre optical sensors may have red emission for the detection of white-green contrasts, and blue emission for the detection of white-yellow contrasts. Four-fibre sensors offer the function of colour reading and discrimination by means of blue, green and red emission. These optical sensors make different types of emission available to a user and, therefore, have the advantage of being adaptable to different applications.

A second aspect of the present invention therefore consists of a device for securing at least one optical fibre to an optical apparatus, the said optical apparatus comprising at least one photo-element, at least one optical fibre which can be connected to the said photo-element, and at least one supporting element provided with at least one guide hole for the said at least one optical fibre, characterized in that it comprises a slide provided with at least one slot, the said slide assuming a first and a second predetermined position, the said slot, in the said first position of the said slide, being coaxial with the said hole of the said supporting element and freely housing the said optical fibre, and the said slot, in the said second position of the said slide, being out of alignment with the said hole and exerting on the said optical fibre a force which keeps the optical fibre secured in the said hole.

According to a preferred embodiment, the said slide is provided with at least two slots. In particular, the said optical apparatus is provided with at least two optical fibres.

According to another preferred embodiment, the device comprises a cover provided with at least one hole for the passage of the said optical fibre, the said cover being provided with an enclosure capable of supporting the said slide so that it is free to slide, and of housing elastic means in engagement with the said slide to keep it in the said second position.

Preferably, the said slot comprises a semi-circular portion having a radius greater than that of the said optical fibre.

In particular, the said semi-circular portion of the said slot has a projecting arm.

The said slot is substantially C-shaped.

Additionally, the said semi-circular portion has a notch capable of imparting elasticity to the said arm.

According to a further preferred embodiment, the said slide is provided with a pin which is used for centring the said elastic means.

The said slide is advantageously made from transparent material. The said cover is also made from transparent material. The said supporting element is also made from transparent material.

Preferably, the said transparent material is selected from those mentioned previously.

In this way a simple and efficient device for securing one or more optical fibres to an optical apparatus is made.

Making the slide and the cover from transparent material provides many advantages.

It is possible to see the optical fibres and the holes of the supporting element through the cover and the slide during the assembly operations. This makes it possible to check the correctness of the coupling of a fibre to a predetermined photo-element (photo-emitter or photo-detector) and the positioning of each fibre with respect to its particular photo-element, which is known to be a very delicate operation. It is also possible to check, at the moment of insertion of the optical fibres into the holes of the supporting element, whether the holes are free or obstructed: and whether a fibre is damaged, by the tearing of a sheath for example.

Finally, the photo-elements are visible through a very wide angle. This enables the different photo-emitters to be clearly distinguished by the colours of the light beams emitted and also enables the photo-emitters to be distinguished with certainty from the photo-detectors. Moreover, it is possible to check, even from a distance, whether any of them are damaged.

The securing device according to the invention is very practical in terms of assembly, since the slide, by means of each slot, performs the double function of releasing and securing an optical fibre. This is achieved by simple movements of the slide between two predetermined positions. Moreover, a multiplicity of optical fibres of the optical apparatus can be released and secured simultaneously by operating the slide alone.

The degree of force, or compression, exerted by each slot on each optical fibre, is predetermined, to make it possible to fix the fibre without damaging it or adversely affecting its capacity for transmitting light.

BRIEF DESCRIPTION OF THE DRAWINGS

Characteristics and advantages of the invention will now be explained with reference to an embodiment illustrated by way of non-restrictive example in the attached figures, of which.

Figure 1:
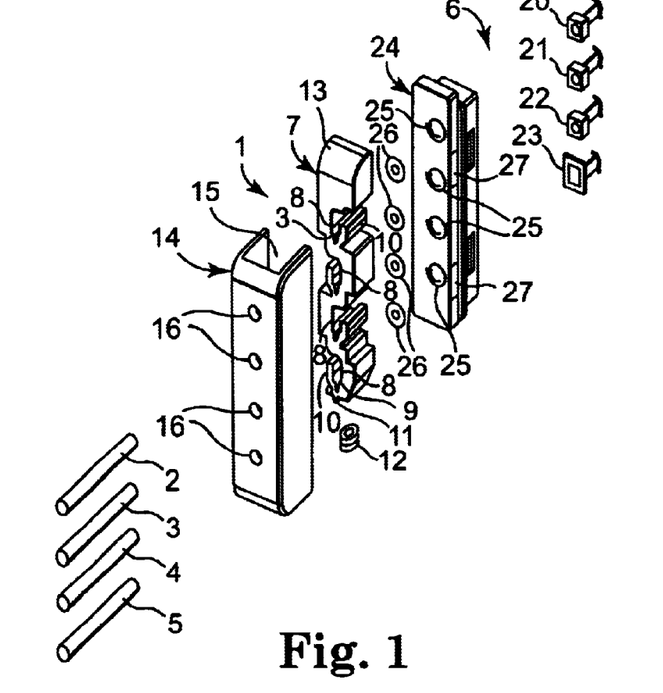
FIG. 1 is an exploded view of a device for securing optical fibres to an optical apparatus, made according to the invention.
Figure 4:
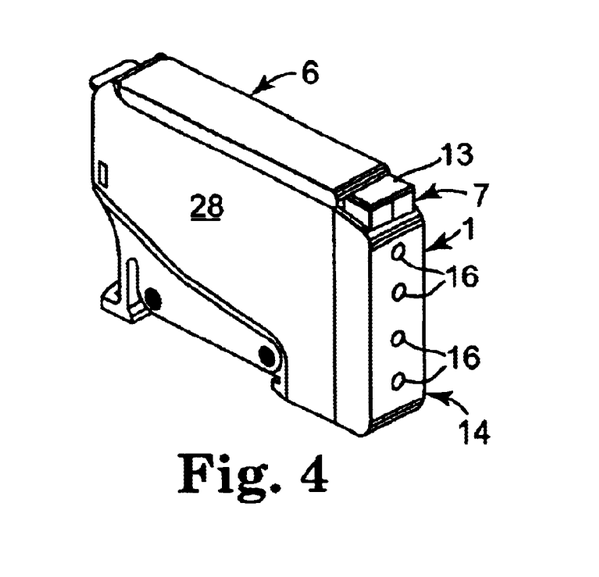
FIG. 4 is a perspective view of the optical apparatus provided with the securing device shown in FIG. 1.

FIGS. 1 and 4 show a device 1 for securing four optical fibres 2, 3, 4 and 5 to an optical apparatus 6 consisting, in this particular case, of an in optical sensor.

DETAILED DISCUSSION OF PREFERRED EMBODIMENTS

Figure 2:
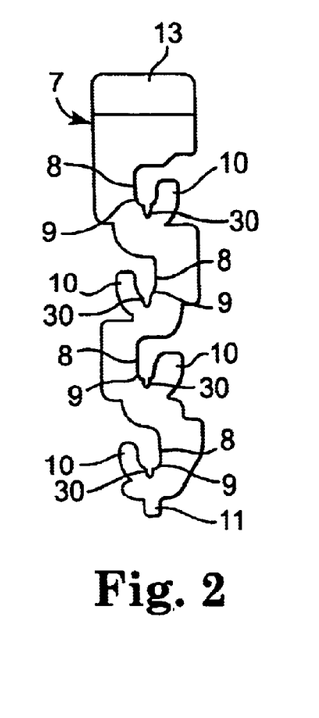
FIG. 2 is a front view of a slide of the securing device shown in FIG. 1.

The device 1 comprises a slide 7 provided with four slots 8 disposed in series. Each slot 8 has a semi-circular portion 9 having a radius greater than that of an optical fibre, and provided with a projecting arm 10. Each slot is substantially C-shaped. The semi-circular portion 9 has a notch 30 (FIG. 2) which has the function of imparting a certain degree of elasticity to the arm 10. The slide is provided with an operating button 13 and an end pin 11 which is used for centring a spring 12.

Figure 3:
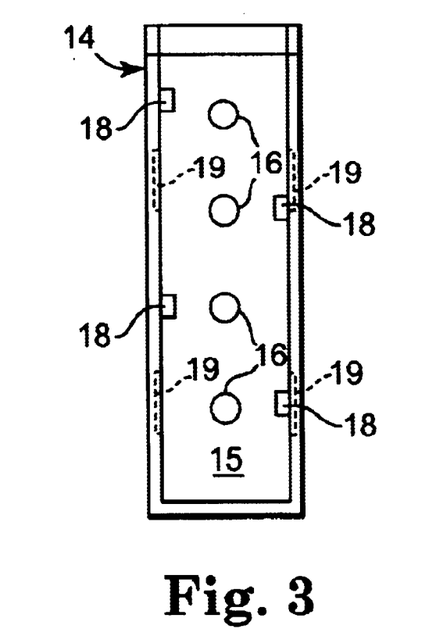
FIG. 3 is a rear view of a cover of the securing device shown in FIG. 1.

The device 1 also comprises a cover 14 provided with an enclosure 15 consisting of a substantially parallelepipedal recess capable of supporting the slide 7 so that it is free to slide, and of housing the spring 12. The cover 14 is provided with four holes 16 for the passage of the optical fibres 2, 3, 4 and 5. The cover 14 is also provided with projections 18, one above, one below and two in intermediate positions (FIG. 3), which act as end stops for the slide 7. The cover 14 also has four recesses 19 whose function will be explained subsequently.

The slide 7 and the cover 14 are made from transparent material selected from the group comprising glass, polycarbonate (PC), polymethyl methacrylate (PMMA), polystyrene (PS), acrylonitrile-styrene (SAN), acrylonitrile-butadiene-styrene (ABS), polyphenylene oxide (PPO), polyurethane (PUR), polysulphone (PSU), polyamide (PA), polyvinyl chloride (PVC), and polyphenylene sulphide (PPS).

The optical sensor 6 comprises photo-elements consisting of three photo-emitters 20, 21 and 22 and a photo-detector 23. Each photo-emitter consists, for example, of a light-emitting diode (LED) and emits a light beam of a predetermined colour. For example, the light beams emitted by the three photo-emitters 20, 21 and 22 are blue, green and red respectively, or other colours. The optical sensor 6 also comprises a supporting element 24 for the photo-emitters 20, 21 and 22 and for the photo-detector 23. The supporting element 24 is provided with four guide holes 25 for the optical fibres 2, 3, 4 and 5. Sealing gaskets 26 for the optical fibres, consisting of O-rings capable of providing protection according to IP67, are fitted in the holes 25. The supporting element 24 is provided with four tabs 27 which are snap-fitted into the recesses 19 of the cover 14 at the time of assembly of the securing device 1 and of the optical sensor 6. The sensor 6 is provided with a container 28 (FIG. 4) in which the supporting element 24 and the photo-elements 20, 21, 22 and 23 are mounted. In the sensor 6, the photo-emitters 20, 21 and 22 are optically connected to the optical fibres 2,3 and 4 respectively, while the photo-detector 23 is optically connected to the optical fibre 5. The optical fibres 2, 3 and 4 transport the light beams towards a region to be monitored, while the optical fibre 5 transports the light reflected (diffused) from the monitored region towards the photo-detector 23.

The supporting element 24 may also be made from a material selected from the group indicated above.

According to a variant, the optical apparatus 6 may comprise two photo-emitters and two photo-detectors.

Figure 5:
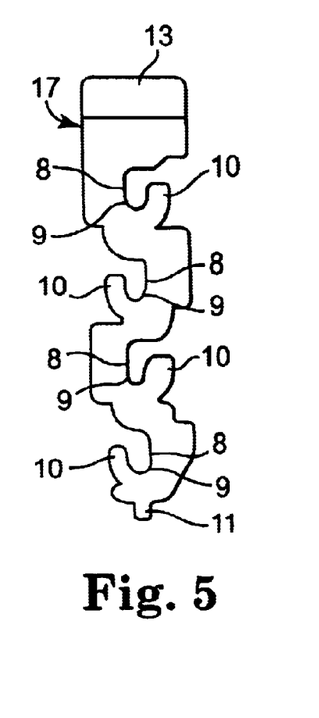
FIG. 5. is a front view of a variant of the slide shown in FIGS. 1 and 2.

FIG. 5 shows a slide 17 in which parts identical to those of the slide 7 are indicated by the same numbers. In the slide 17, the semi-circular portions 9 of the slots 8 have no notches.

The securing device 1 is assembled by mounting the spring 12 on the pin 11 of the slide 7 and inserting the slide and spring in the recess 15 of the cover 14. The spring 12 pushes the slide 7 upwards against the upper end stop projection 18. In this way, the button 13 of the slide emerges from the enclosure 15 of the cover 14 and can be operated manually (FIG. 4).

Figure 6:
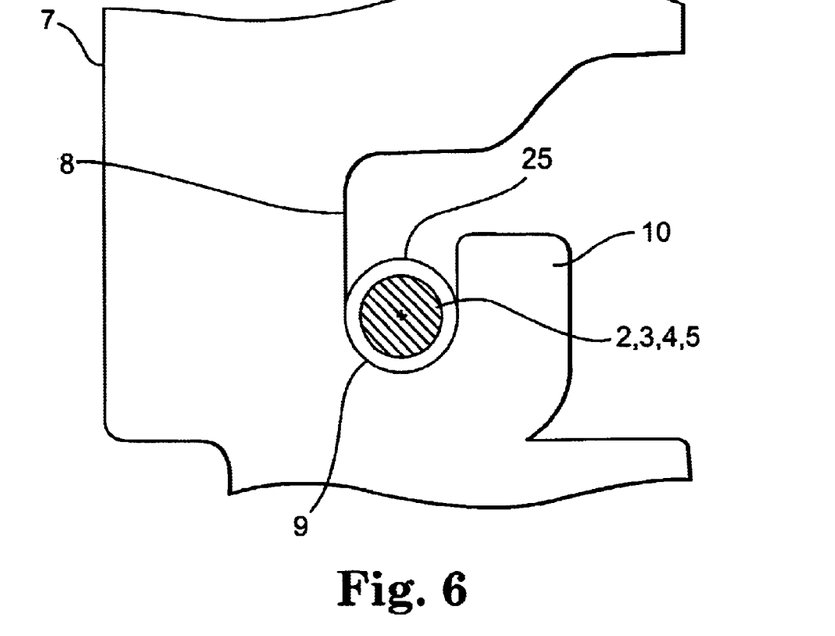
FIG. 6. is a view illustrating one position with coaxial alignment of slots of the slide with holes of the support element.

The sensor 6 is assembled by mounting in the container 28 the supporting element 24 pre-assembled with the photos-emitters 20, 21 and 22, the photo-detector 23 and the sealing gaskets 26 disposed in the holes 25. The securing device 1 is then fixed to the sensor 6 by snap-fitting that cover 14 on the supporting element 24, by means of the tabs 27 which fit into the recesses 19. At this point, the slide 7 is pushed downwards by pressure on the button 13, against the action of the spring 12. In this way, the slide 7 assumes a first end position in which the semi-circular portions 9 of the slots 8 of the slide 7 are disposed coaxially with the holes 16 of the cover 14 and with the holes 25 of the supporting element 24 (see FIG. 6). The optical fibres 2, 3, 4 and 5 can then be inserted through the holes 16, semi-circular portions 9 of the slots 8 and the holes 25 until they are brought into contact with the photo-emitters 20, 21 and 22 and with the photo-detector 23. Since the cover 14 and the slide 17 are made from transparent material, it is possible to see the optical fibres and to check whether they enter the holes 25 without obstruction and whether they are positioned correctly with respect to the photo-elements. After this, the button 13 of the slide 7 is released, and the slide is pushed upwards by the spring 12, being stopped by the upper projection 18 of the cover 14. In this way, the slide 7 assumes a second end position in which the semi-circular portions 9 of the slots 8 are out of alignment with the holes 16 and 25 (see FIG. 7) and exert a force of a predetermined value on the optical fibres 2, 3, 4 and 5 to secure them in the holes 25.

What is claimed is:

1. A securing device for releasably connecting at least one optical fiber to an optical apparatus where said optical apparatus comprises at least one photo-element mounted on a supporting element, said device including means for releasably connecting said at least one optical fiber in optical alignment with said at least one photo-element, said at least one optical fiber being brought into direct contact with said at least one photo-element, wherein at least a part of said device is made from a transparent material making a region of optical alignment in contact coupling between the at least one optical fiber and the at least one photo-element externally visible.

2. Securing device according to claim 1, wherein said device comprises a rover made from a transparent material.

3. Securing device according to claim 1, wherein said supporting element is made from transparent material.

4. Securing device according to claim 1, wherein said transparent material is selected from the group comprising glass, polycarbonate, polymethyl methacrylate, polystyrene, acrylonitrile-styrene, acrylonitrile-butadiene-styrene, polyphenylene oxide, polyurethane, polysulphone, polyamide, polyvinyl chloride, and polyphenylene sulphide.

5. A securing device for connecting at least one optical fiber to an optical apparatus, said optical apparatus comprising at least one photos-element, said at least one optical fiber connectable to said at least one photo-element, and at least one supporting element provided with at least one guide hole, having an axis, for said at least one optical fiber, wherein said device comprises a single-piece slide provided with at least one fixed-size slot having a semi-circular portion having an axis, wherein said axis passes through the center of said semi-circular portion of said slot, said slide moveable between a first and a second predetermined position, said second position being defined by stops, said axis of said semi-circular portion of said slot, in said first position of said slide, being coaxial with said axis of said hole of said supporting element and said semi-circular portion freely housing said at least one optical fiber, and said axis of said semi-circular portion of said slot, in said second position of said slide, being out of alignment with said axis of said hole such that said semi-circular portion of said slot exerts, in said second position of said slide, on said at least one optical fiber a force which keeps the at least one optical fiber secured in said hole.

6. Securing device according to claim 5, wherein said slide is provided with at least two slots.

7. Securing device according to claim 6, wherein said optical apparatus is provided with at least two optical fibers.

8. Securing device according to claim 5, wherein said device comprises a cover provided with at least one hole for passage of said optical fiber, said cover being provided with an enclosure supporting said slide for slidable movement, and housing an elastic means in engagement with said slide to keep said slide in said second position.

9. Securing device according to claim 5, wherein said semi-circular portion of said slot has a radius greater than a radius of said at least one optical fiber.

10. Securing device according to claim 9, wherein said semi-circular portion of said slot has a projecting arm.

11. Securing device according to claim 9, wherein said slot is substantially C-shaped.

12. Securing device according to claim 10, wherein said semi-circular portion has a notch capable of imparting elasticity to said arm.

13. Securing device according to claim 8, wherein said slide is provided with a pin which is used for centering said elastic means.

14. Securing device according to claim 8, wherein said cover is made from transparent material.

15. Securing device according to claim 5, wherein said supporting element is made from transparent material.

16. Securing device according to claim 5, wherein said at least one photo-element is mounted on said supporting element.

17. A securing device for connecting at least one optical fiber to an optical apparat, said optical apparatus comprising at least one photo-element, said at least one optical fiber connectable to said at least one photo-element, and at least one supporting element provided with at least one guide hole, having an axis, for said at least one optical fiber, wherein said device comprises a slide provided with at least one slot having a semi-circular portion having an axis, said slide moveable between a first and a second predetermined position, said second position being defined by stops, said axis of said semi-circular portion of said slot, in said first position of said slide, being coaxial with said axis of said hole of said supporting element and freely housing said at least one optical fiber, and said axis of said semi-circular portion of said slot, in said second position of said slide, being out of alignment with said axis of said hole and exerting on said at least one optical fiber a force which keeps said at least one optical fiber secured in said hole, wherein said slide is made from transparent material making a region of optical alignment in coupling between said at least one optical fiber and said at least one photo-element externally visible.

18. Securing device according to claim 17, wherein said transparent material is selected from the group comprising glass, polycarbonate, polymethyl methacrylate, polystyrene, acrylonitrile-styrene, acrylonitrile-butadiene-styrene, polyphenylene oxide, polyurethane, polysulphone, polyamide, polyvinyl chloride, and polyphenylene sulphide.

19. Device for releasably connecting at least one optical fiber to an optical apparatus said optical apparatus comprising at least one photo-element mounted on a transparent supporting element, said device including means for releasably connecting said at least one optical fiber to said at least one photo-element, said at least one optical fiber being brought into direct contact with said at least one photo-element, wherein said device includes a cover made of a transparent material making a region of contact coupling between the at least one optical fiber and the photo-element externally visible.

20. Optical equipment comprising:

an optical apparatus comprising at least one photo-element, at least one optical fiber, and a device for releasably connecting said at least one optical fiber in optical alignment with a respective one of said at least one photo-element, said at least one optical fiber being brought into direct contact with said at least one photo-element, wherein at least a part of said releasably connecting device is made form a transparent material in order to make a region of optical alignment in contact coupling between the at least one optical fiber and the at least one photo-element externally visible.

21. Optical equipment according to claim 20, wherein said parent material is selected from the group comprising glass, polycarbonate (PC), polymethyl methacrylate (PMMA), polystyrene (PS), acrylonitrile-styrene (SAN), acrylonitrile-butadiene-styrene (ABS), polyphenylene oxide (PPO), polyurethane (PUR), polysulphone (PSU), polyamide (PA), polyvinyl chloride (PVC), and polyphenylene sulphide (PPS).

22. Optical equipment according to claim 20, wherein said optical apparatus comprises a supporting element for said at least one photo-element, said supporting element being made from a transparent material.

23. Optical equipment comprising:

at least one optical fiber, an optical apparatus comprising at least one photo-element, and a supporting element provided with at least one guide hole, having an axis, for a respective one of said at least one optical fiber, and a device for connecting said at least one optical fiber 10 a respective one of said at least one photo-element, wherein said connecting device comprises a single-piece slide provided with at least one fixed-size slot having a semi-circular portion having an axis, said slide being movable between a first and a second predetermine position, said second predetermined position being defined by stops, said axis of said semi-circular portion of said at least one slot, in said first position of said slide, being coaxial with said axis of said at least one hole of said supporting element and freely housing said at least one optical fiber, and said axis of said semi-circular portion of said at least one slot, in said second position of said slide, being out of alignment with said axis of said at least one hole and exerting on said at least one optical fiber a force which keeps said at least one optical fiber secured in said at least one hole, said slide being made of a transparent material making a region of optical alignment in coupling between said at least one optical fiber and said at least one photo-element externally visible.

24. Optical equipment according to claim 23, wherein said connecting device further comprises a cover, said cover is provided with at least one hole for passage of said at least one optical fiber and with an enclosure, said enclosure supporting said slide for slidable movement and housing elastic means to maintain said slide in said second position.

25. Optical equipment according to claim 24, wherein said cover is made from a transparent material.

26. Optical equipment comprising at least one optical fiber, an optical apparatus co at least one photo-clement, and a supporting element provided with at least one guide hole, having an axis, for a respective one of said at least one optical fiber, and a device for connecting said at least one optical fiber to a respective one of said at least one photo-element, wherein said connecting device comprises a slide provided with at least one slot having a semi-circular portion having an axis, said slide being movable between a first and a second predetermined position, said second predetermined position being defined by stops, said axis of said semi-circular portion of said at least one slot, in said first position of said slide, being coaxial with said axis of said at least one hole of said supporting element and freely housing said at least one optical fiber, and said axis of said semi-circuular portion of said at least one slot, in said second position of said slide, being out of alignment with said axis of said at least one hole and exerting on said at least one optical fiber a force which keeps said at least one optical fiber secured in said at least one hole, wherein said slide is made from transparent material.

* * * * *

UNITED STATES PATENT AND TRADEMARK OFFICE
CERTIFICATE OF CORRECTION

Figure 7:
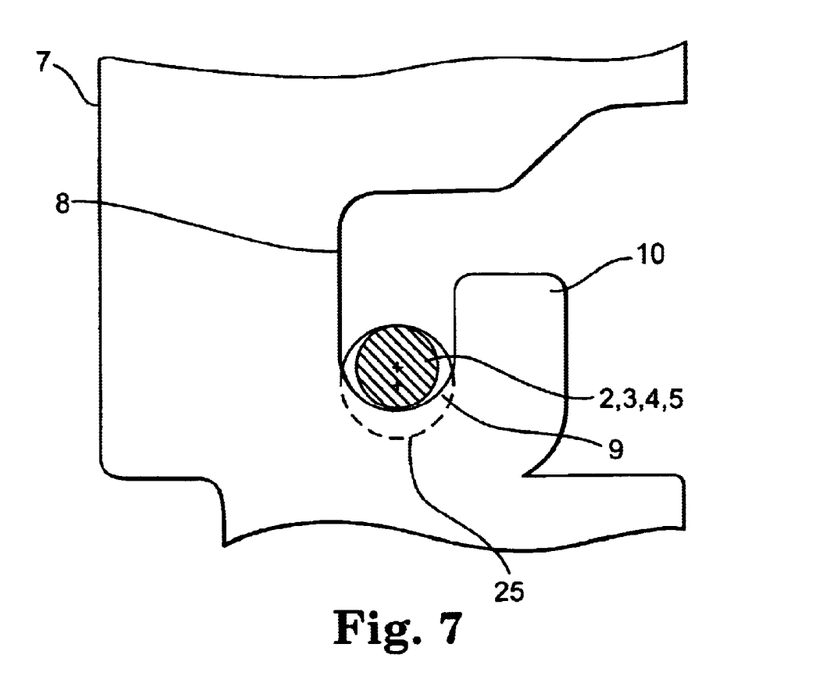
FIG. 7, is a view illustrating a second position in which slots are out of alignment with holes of the supporting element.

PATENT NO. : 6,781,112 B1
DATED : August 24, 2004
INVENTOR(S) : Enzo Fei and Daniele Lippi It is certified that error appears in the above-identified patent and that said Letters Patent is hereby corrected as shown below:

Column 1,
Line 8, after the word "fibre" please delete "a" and insert therefore -- an --
Line 18, after "invention" delete "," and insert -- ; --
Line 30, delete "FIG.7," and insert -- FIG. 7. --

Column 4,
Line 47, after "fitting" delete "that" and insert -- the --

Column 5,
Line 18, delete "rover" and insert -- cover --
Line 28, delete "photos-element" and insert -- photo-element --

Column 6,
Line 12, delete "apparat" and insert -- apparatus --
Line 41, after the first word of apparatus insert -- , --
Line 60, delete "form" and insert -- from --
Line 65, "parent" and insert -- transparent --

Column 7,
Line 20, delete "predetermine" and insert -- predetermined --
Line 11, delete "co" and insert -- comprising --

Column 8,
Line 26, delete "ciruular" and insert -- circular --

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO.         : 6,781,112 B1
APPLICATION NO. : 09/401730
DATED                  : August 24, 2004
INVENTOR(S)       : Enzo Fei and Daniele Lippi It is certified that error appears in the above-identified patent and that said Letters Patent is hereby corrected as shown below:

<u>Column 1</u>

Line 10, after the word "fibre to" please delete "a" and insert therefore --an--

<u>Column 3</u>

Line 18, after "invention" delete "," and insert therefore --;--

Line 31, delete "FIG. 7," and insert therefore --FIG. 7.--

<u>Column 4</u>

Line 47, after "fitting" delete "that" and insert therefore --the--

<u>Column 5</u>

Line 17, delete "rover" and insert therefore --cover--

Line 28, delete "photos-element" and insert therefore --photo-element--

<u>Column 6</u>

Line 12, delete "apparat" and insert therefore --apparatus--

Line 41, after the first word of apparatus insert therefore --,--

Line 60, delete "form" and insert therefore --from--

Line 65, delete "parent" and insert therefore --transparent--

<u>Column 7</u>

Line 21, delete "predetermine" and insert therefore --predetermined--

UNITED STATES PATENT AND TRADEMARK OFFICE
CERTIFICATE OF CORRECTION

PATENT NO.       : 6,781,112 B1
APPLICATION NO.  : 09/401730
DATED            : August 24, 2004
INVENTOR(S)      : Enzo Fei and Daniele Lippi It is certified that error appears in the above-identified patent and that said Letters Patent is hereby corrected as shown below:

<u>Column 8</u>

Line 12, delete "co" and insert therefore --comprising--

Line 28, delete "ciruular" and insert therefore --circular--

Signed and Sealed this

Seventh Day of October, 2008

JON W. DUDAS
*Director of the United States Patent and Trademark Office*